United States Patent
Deepak et al.

(10) Patent No.: US 12,446,091 B2
(45) Date of Patent: Oct. 14, 2025

(54) SYSTEM FOR ESTABLISHING INITIAL COMMUNICATION WITH SATELLITE SYSTEM

(71) Applicant: AMAZON TECHNOLOGIES, INC., Seattle, WA (US)

(72) Inventors: Deepak, Sammamish, WA (US); Bulin Zhang, Redmond, WA (US); Kavitha Kamarthy, San Jose, CA (US); Sharanya Subramanian, Fremont, CA (US); Srikar Rajamani, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 624 days.

(21) Appl. No.: 17/805,911

(22) Filed: Jun. 8, 2022

(65) Prior Publication Data
US 2023/0403744 A1    Dec. 14, 2023

(51) Int. Cl.
| | |
|---|---|
| *H04W 74/0833* | (2024.01) |
| *H04B 7/185* | (2006.01) |
| *H04W 36/00* | (2009.01) |
| *H04W 72/21* | (2023.01) |
| *H04W 76/18* | (2018.01) |

(52) U.S. Cl.
CPC .... *H04W 74/0833* (2013.01); *H04B 7/18526* (2013.01); *H04B 7/18558* (2013.01); *H04W 36/0016* (2013.01); *H04W 72/21* (2023.01); *H04W 76/18* (2018.02)

(58) Field of Classification Search
CPC .......................... H04W 76/18; H04W 74/0833
See application file for complete search history.

(56) References Cited

U.S. PATENT DOCUMENTS

| | | | |
|---|---|---|---|
| 11,848,746 B1* | 12/2023 | Wang | H04B 7/18539 |
| 2022/0046425 A1 | 2/2022 | Edge et al. | |
| 2023/0396324 A1* | 12/2023 | Chen | H04W 72/21 |

OTHER PUBLICATIONS

Nilsson, Martin, "International Search Report and the Written Opinion of the International Searching Authority dated Aug. 30, 2023", Patent Cooperation Treaty Application Number PCT/US23/65403, Patent Cooperation Treaty, Aug. 30, 2023.
Tang, Xiaofan, "International Preliminary Report on Patentability dated Dec. 19, 2024", Patent Cooperation Treaty Application Number PCT/US23/65403, Patent Cooperation Treaty, Dec. 19, 2024.

\* cited by examiner

*Primary Examiner* — Abdeltif Ajid
(74) *Attorney, Agent, or Firm* — Lindauer Law, PLLC

(57) ABSTRACT

A satellite constellation provides communication between user terminals (UTs) and ground stations that connect to other networks, such as the Internet. Satellites transmit beacon transmissions to particular areas on Earth as particular times. The beacon transmissions include information used by a UT to use a random access channel (RACH) uplink to request communication. Responsive to the request, encryption is established between the satellite and the UT. The satellite may then allocate uplink resources, send data to the UT on a downlink, and so forth. The UT receives additional data about future handovers to other satellites. Based on previously received data the UT may quickly re-establish communication with a satellite after an interruption, such as due to a power outage at the UT. If the previously received data has expired, the UT may again use a beacon transmission.

20 Claims, 10 Drawing Sheets

SYSTEM FOR ESTABLISHING INITIAL COMMUNICATION WITH SATELLITE SYSTEM

BACKGROUND

A satellite may provide communication service to many user terminals. These user terminals may be in contention with one another for use of an uplink to send data from individual user terminals to the satellite.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
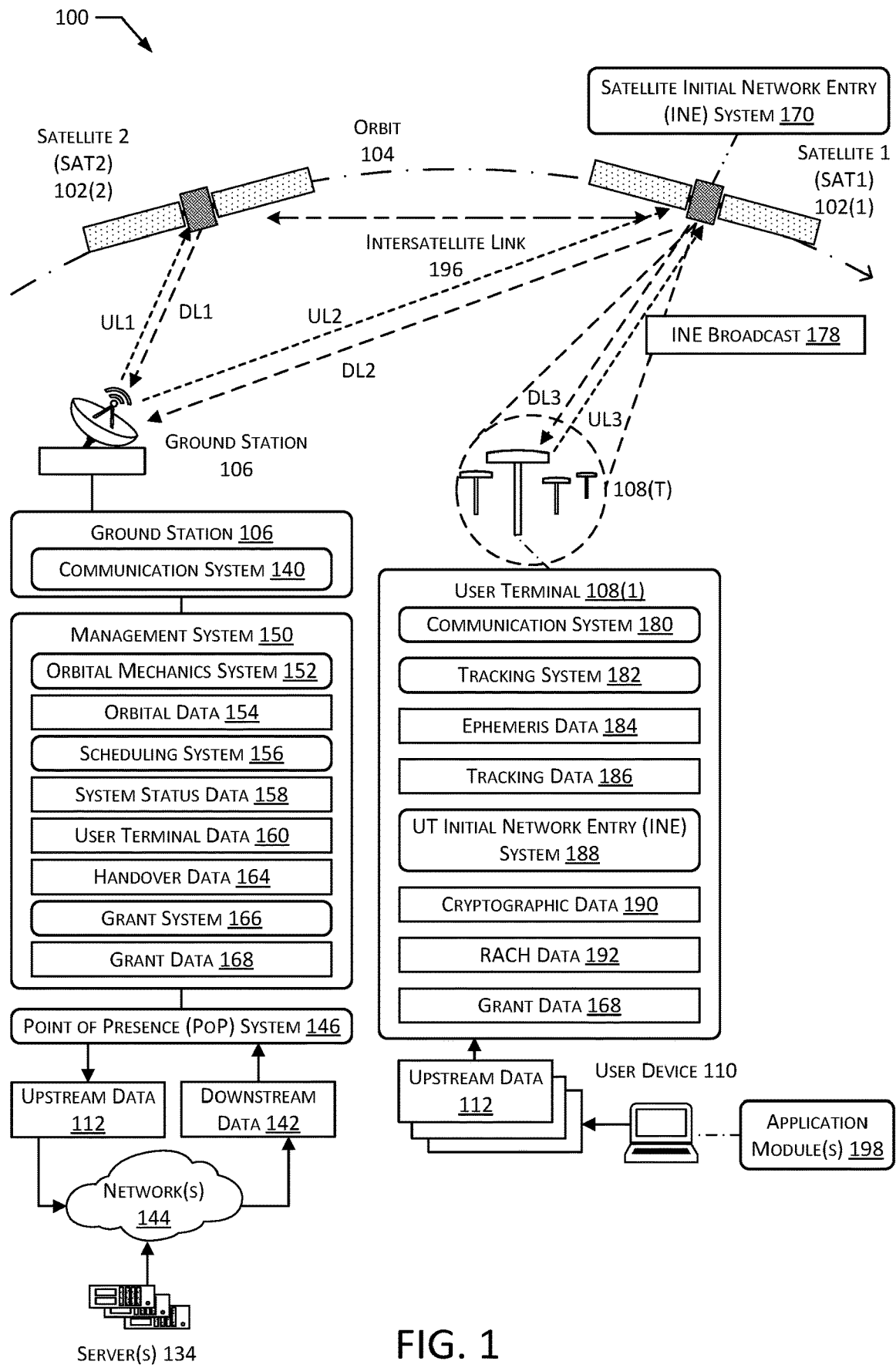
FIG. 1 illustrates an initial network entry (INE) system for a system utilizing user terminals (UTs) and a constellation of satellites, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. The satellites provide communication services between devices, such as user terminals (UT) located on or in the vicinity of a body such as the Earth. A first UT may communicate with a first satellite to send and receive data to a ground station, another satellite, and so forth. For example, the first satellite may send upstream data to a ground station that in turn sends the upstream data to a point-of-presence (PoP). The PoP may then send the upstream data to a device on another network, such as a server on the Internet.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used. One aspect of satellites in NGOs is that they are in constant motion relative to the Earth, resulting in a highly dynamic environment with satellites moving into and out of range of individual UTs in the span of minutes.

The constellation of many satellites, including those in NGO, provides substantial utility to UTs in many situations. UTs may be stationary such as at a home or business, mobile such as on a vehicle, and so forth. The location of a UT within a geographic area may be dynamic and change over time. Some geographic areas may include many UTs at a given time, while other geographic areas may include no UTs until one is moved into that geographic area and activated.

When activated, a UT performs a set of operations to join a communication network provided by the constellation of satellites. These operations may be referred to as "initial network entry" (INE). Traditional systems have utilized techniques such as manual pre-configuration of user terminals and ground stations, locking onto a constant broadcast transmitted by a satellite, and so forth. However, these techniques suffer a variety of drawbacks. Manual techniques are labor intensive and do not scale well to larger groups of user terminals. Constant broadcast transmissions reduce the overall throughput efficiency of a satellite as the broadcasts consume communication resources such as frequencies and time that cannot otherwise be used to send data to user terminals, and so forth.

Described in this disclosure are systems and techniques for INE that allow a UT to establish communication with a satellite. The INE described in this disclosure allows the UT to determine the communication resources used for uplink and downlink and facilitates authentication of the UT. An authenticated UT is a device that is deemed to be permitted access to the satellite for subsequent communication. Authentication may occur at one or more different protocol layers, such as at a media access control (MAC) layer, network layer, application layer, and so forth.

The INE described herein results in greater efficiency with regard to the use of communication resources, resulting in a substantial reduction in the broadcast overhead compared to traditional systems. The constellation described herein may transmit INE broadcasts to discrete geographic areas or "spots" at particular times. The INE broadcasts include information that may be used by a UT to send an INE request on a random access channel (RACH) uplink. Responsive to this, a series of operations are performed to establish communication and authentication.

Variations in the INE process accommodate operation under different conditions. A "cold" INE occurs when a UT is joining the network without the benefit of current information such as satellite ephemeris, communication resources currently allocated to a particular spot, and so forth. For example, a cold INE may occur for a new UT that is joining the network for the first time. In another example, a cold INE may occur for a UT that is re-joining the network after having been offline for several days or more. A cold INE may be further subdivided into situations for which a satellite is already providing communication service to the spot that the UT is in, or situations in which the UT is the only or first UT in that spot.

A "warm" INE occurs when a UT has recently been in communication with the network and has current information such as satellite ephemeris, communication resources currently allocated to the spot the UT is within, and so forth. A warm INE may occur in a situation such as after a restart of the UT due to a power loss at the UT, restart of equipment such as at the UT or the satellite, and so forth. The warm INE uses the available information to more quickly re-establish communication, compared to the cold INE.

By using the system and techniques described in this disclosure, UTs are able to quickly and efficiently perform initial network entry. Compared to traditional techniques, overhead such as communication resources consumed by broadcast transmissions are substantially reduced. As a result, efficiency of a communication system using a satellite constellation is substantially improved.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. As the height of a relay station having a radio receiver and transmitter with its antennas increases above the ground, it is able to provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(T), each satellite 102 being in orbit 104. Also shown is a ground station 106, user terminals (UTs) 108, and user devices 110. Each user device 110 may execute one or more application modules 198. For example, the application modules 198 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 196 provides for communication between satellites 102 in the constellation.

One or more ground stations 106 are in communication with one or more satellites 102. The ground stations 106 may pass data between the satellites 102, a management system 150, networks 144 such as the Internet, and so forth. The networks 144 may be in communication with one or more servers 134. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks 144. For example, the ground station 106 may connect to a terrestrial fiber optic communication network. The ground station 106 may act as a network gateway, passing data between the one or more communication networks 144 and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth. In some implementations, the orbital data 154, or a portion thereof, may be provided to the UTs 108. For example, ephemeris data 184 indicative of orbital elements of at least some of the satellites 102 in the constellation may be sent to the UTs 108.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. These communication parameters may be associated with operation of an uplink to the satellite 102, downlink from the satellite 102 to the UT 108, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

In some implementations the system status data 158 may be indicative of an expected UT 108. For example, the system status data 158 may be indicative of a UT 108 that is expected to perform an initial network entry (INE) process within a particular spot. Continuing the example, based on physical shipment information such shipping addresses to which UTs 108 have been or are scheduled to be physically delivered, the system status data 158 may determine a set of one or more UTs 108 that may be joining the network.

The user terminal data 160 may comprise information such as a location of a particular UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2). The handover data 164, or a portion thereof, may be provided to the UTs 108. For example, handover data 164 for one or more future handovers may be sent to a UT 108. In some implementations, handover data 164 may be distributed to a set of UTs 108 that are located within a particular geographic area or "spot".

The resource scheduling system 156 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the resource scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, the secondary satellite 102(3), the UT 108, or other devices. For example, the second satellite 102(2) may use an ISL 196 to send the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

In some implementations, the management system 150 may include a grant system 166 that determines grant data 168. The grant system 166 may accept as input one or more of system status data 158, user terminal data 160, or information about one or more of upstream data 112 or downstream data 142. For example, the grant system 166 of the management system 150 may analyze the upstream data 112 to a particular UT 108 and downstream data 142 from the particular UT 108 to determine the grant data 168. In one implementation, a machine learning system may be trained to use scheduling input data to determine if the UT 108 is likely to have upstream data 112 to transmit to the satellite 102.

In some implementations grant data 168 may be determined responsive to a request. For example, a UT 108 may send a request for uplink resources. Responsive to the request, the satellite 102 or other portion of the system 100 may determine grant data 168 that allocates communication resources associated with an uplink to a satellite 102.

The grant data 168 is indicative of one or more parameters associated with uplink communication between the UT 108 and the satellite 102. For example, the grant data 168 may indicate the satellite identifier, subbeam identifier, uplink frequency, assigned timeslot, signal encoding, and so forth.

The grant system 166 of the management system 150 may send the grant data 168 to the satellite 102 that is in communication with the UT 108. In one implementation, a resource scheduler onboard the satellite 102 may then allocate uplink communication resources consistent with the grant data 168 and then send the grant data 168 to the UT 108. In another implementation, the resource scheduler onboard the satellite 102 may receive first grant data 168(1) from the management system 150 and generate second grant data 168(2). For example, the second grant data 168(2) may specify a particular frequency, timeslot, and so forth that is not specified in the first grant data 168(1).

In another implementation, the resource scheduler onboard the satellite 102 may receive a request, such as via a random access channel (RACH). Responsive to the request, the satellite 102 may provide grant data 168.

The satellite 102 may include a satellite initial network entry (INE) system 170. The satellite INE system 170 may initiate transmission of INE broadcast(s) 178 by the satellite 102. The INE broadcast 178 may be transmitted to particular spots at particular times. Operation of the satellite INE system 170 is discussed in more detail with regard to the following figures, such as FIGS. 7A, 7B, 8, and 9.

The UT 108 includes a communication system 180, such as a satellite network interface, to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes data between the constellation of satellites 102 and the user device 110. The UT 108 may connect to the user device 110 using a second network interface. For example, the second network interface may comprise a wireless local area network, wired local area network, terrestrial wide area network, and so forth. The user device 110 may execute one or more application modules 198. The data includes upstream data 112 sent by the user device 110 or downstream data 142 that is addressed to the UT 108 or the user device 110. For example, during operation the application module 198 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

The UT 108 includes a tracking system 182. The tracking system 182 uses ephemeris data 184 to determine tracking data 186. The ephemeris data 184 provides information indicative of orbital elements of the orbit 104 of one or more satellites 102. For example, the ephemeris data 184 may comprise orbital elements such as "two-line element" data for the satellites 102 in the constellation. The ephemeris data 184 may be stored in memory of the UT 108 as part of provisioning and shipment to an end user. After initial network entry, the UT 108 may receive ephemeris data 184 using the communication system 180.

The tracking system 182 may use the current location of the UT 108 and the ephemeris data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102, time of flight correction, or other information associated with a specified time. The determination of the tracking data 186 may be ongoing. For example, the first UT 108 may determine tracking data 186 every 100 ms, every second, every five seconds, or at other intervals.

The UT 108 includes a UT initial network entry (INE) system 188. The UT INE system 188 may coordinate performance of the initial network entry operations as described in this disclosure. For example, the UT INE system 188 may use information included in the INE broadcast 178 to send an INE request to the satellite 102. The satellite INE system 170 may respond to this request. During the INE process, cryptographic data 190 may be determined. For example, cryptographic nonce values, keys, certificates, and so forth may be used to provide for authentication, encryption, and so forth. The UT INE system 188 may determine or receive RACH data 192 from the satellite 102 during operation. For example, the INE broadcast 178 may include information that specifies frequencies and so forth with respect to a random access channel (RACH) of an uplink to the satellite 102. The RACH may be random access in that individual UTs 108 may utilize the RACH on an ad hoc basis without prior knowledge of whether other UTs 108 may be transmitting at that time. Operation of the UT INE system 188 is discussed in more detail with regard to the following figures, such as FIGS. 7A, 7B, 8, and 9.

Once the INE has been completed, the UT 108 may begin to send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet. The satellite 102 may provide grant data 168 to the UT 108 to allocate communications resources on the uplink. In some implementations, after INE the UT 108 may utilize RACH to send buffer status data (BSD) indicative of upstream data 112 queued for transmission. Responsive to this, the satellite 102 may send grant data 168 that allocates to the UT 108 communication resources on the uplink to the satellite 102. In other implementations, grant data 168 may be determined and provided to the UT 108 prospectively, based on analysis of one or more of upstream data 112 or downstream data 142, and so forth.

The RACH may also implement other techniques, such as a non-orthogonal multiple access (NOMA) to the RACH. A NOMA architecture is able to operate when two or more transmissions at least partially overlap in time and space. For example, a NOMA architecture may operate on the uplink, allowing UT 108(2039) and UT (3939) to both send a message to the satellite 102(1) during the same time and using the same frequency(s).

The system 100 may include one or more PoP systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular spot or set of spots.

The PoP systems 146 may manage communication between the system 100 and the network 144. For example, a first PoP system 146 may receive the upstream data 112 and send that upstream data 112 to the network 144. In another example, the first PoP system 146 may receive the downstream data 142 and proceed to attempt delivery of the downstream data 142 to the UT 108.

The PoP system 146 is in communication with one or more ground stations 106(1), 106(2), . . . , 106(G) and the management system 150. In some implementations one or more functions may be combined. For example, the PoP system 146 may perform one or more functions of the management system 150. In another example, the PoP system 146 may be included in an integrated ground station 106.

The satellite 102, the ground station 106, the user terminal 108, the user device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
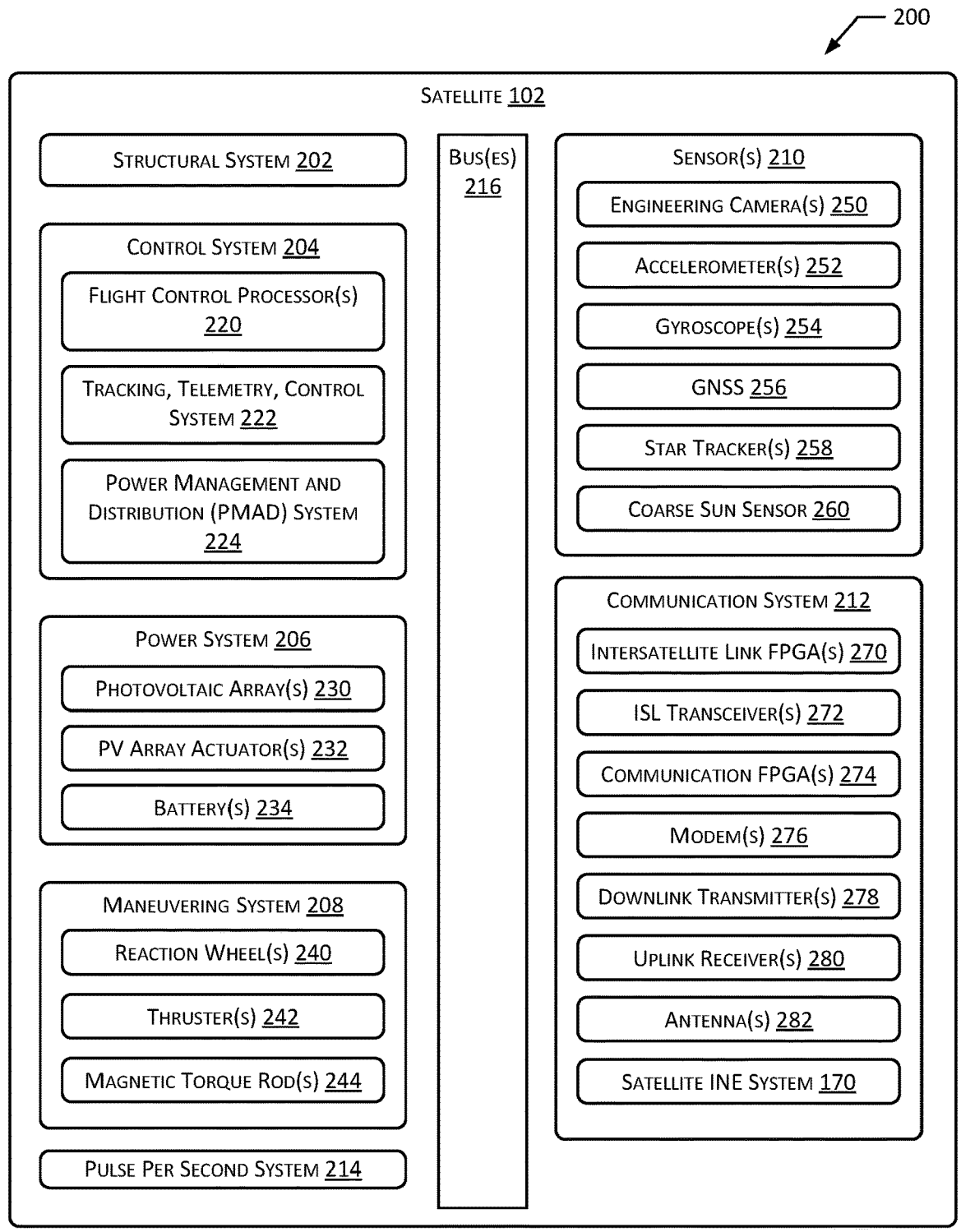
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted, or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 196. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may include the satellite INE system 170 that facilitates UTs 108 entering the network. For example, the communication FPGA 274 may process a message such as an INE request that is received from a UT 108 by the uplink receiver 280. Responsive to the message, and subject to the availability of communication resources associate with the uplink, the satellite INE system 170 executing on the communications FPGA 274 may perform at least a portion of the INE process described herein. Information such as INE broadcasts 178, a response to the INE request, and so forth may be sent using the downlink transmitter 278.

Figure 3:
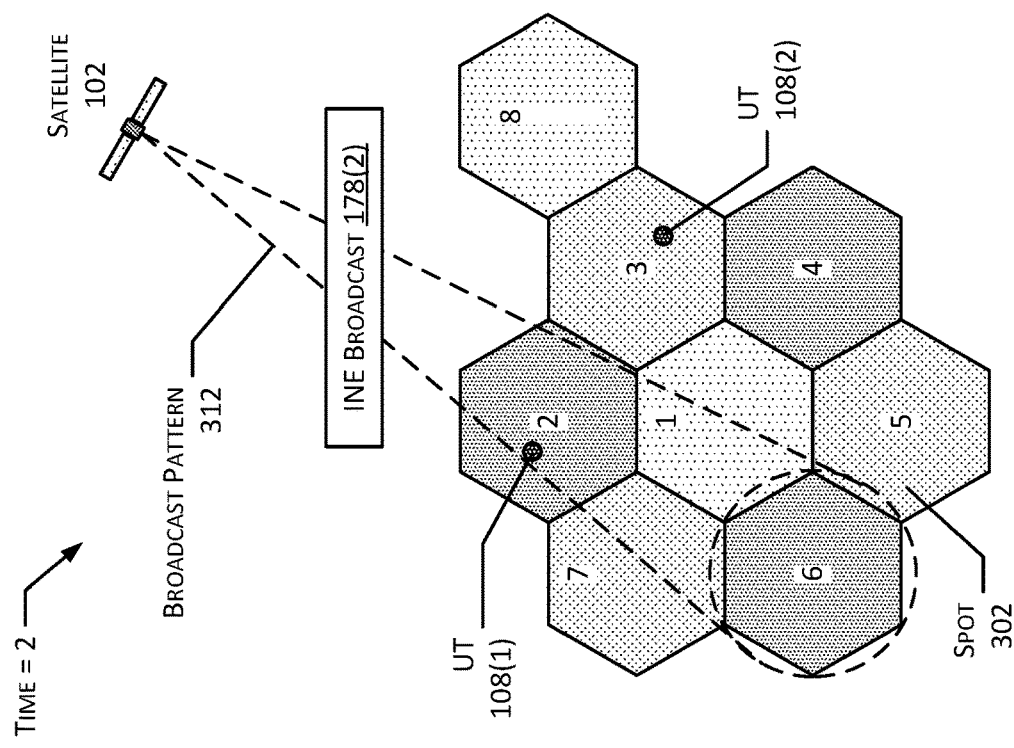
FIG. 3 illustrates transmission of INE broadcasts to respective spots on Earth at different times, according to some implementations.
Figure 3:
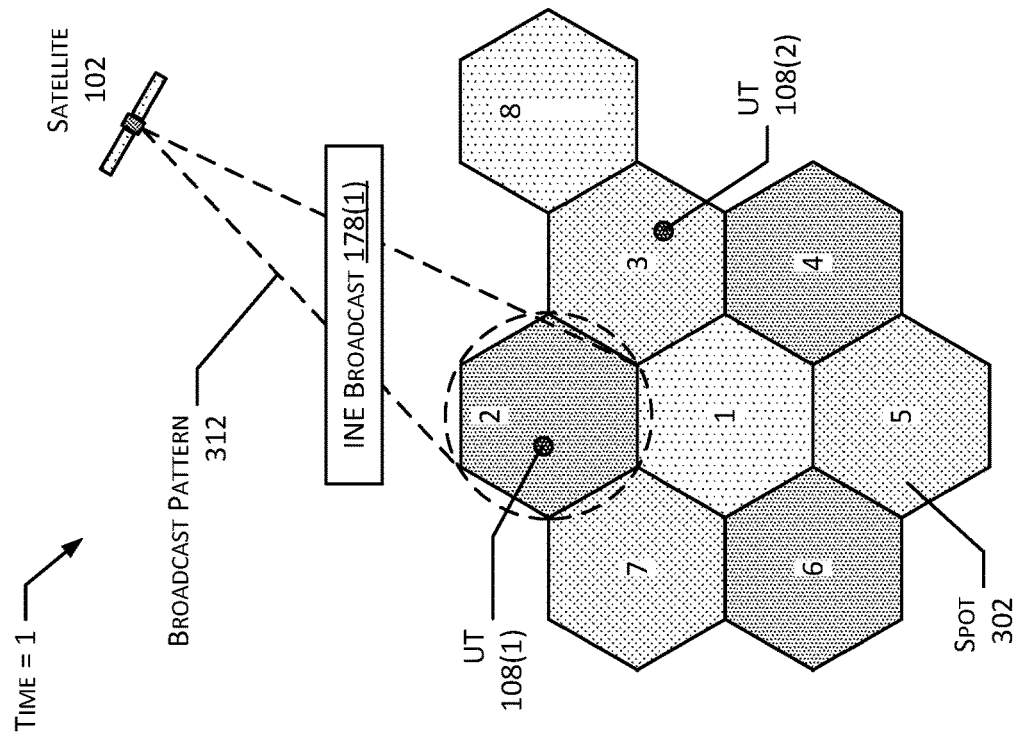

FIG. 3 illustrates at 300, transmission of INE broadcasts 178 to respective spots on Earth at different times, according to some implementations.

A spot 302 may comprise a particular geographic area. For example, the geographic area may comprise a specified area on Earth. In the implementation depicted here, the spot 302 may comprise a geographic area on the Earth. One or more UTs 108 may be present within one or more spots 302.

The spots 302(1), 302(2), . . . , 302(S) may be arranged to cover at least a portion of a surface, physical area such as a portion of the sky, and so forth. For example, the Earth may be tessellated into spots 302 that are hexagonal or some other space filling polygon arrangement. In some implementations, a spot 302 may be sized to correspond to a footprint of a subbeam. For example, the spot 302 may comprise an area on the surface of the Earth that corresponds to an uplink subbeam and a downlink subbeam.

A broadcast pattern 312 is depicted that represents a volume within which an expected link budget may be maintained that allows a UT 108 to receive an INE broadcast 178 from the satellite 102. In some implementations, the broadcast pattern 312 may be the same, or similar to, an antenna gain pattern associated with a particular uplink subbeam, a particular downlink subbeam, and so forth.

In this illustration, the satellite 102 may be providing communication service to a plurality of the spots, such as spots 302(1), . . . . 308(8). Instead of continuously transmitting a broadcast signal across the combined areas of spots 302(1)-(8), the satellite 102 may transmit an INE broadcast 178 to one spot 302 at a time. For example, as shown here, at time t=1 the satellite 102 is transmitting INE broadcast 178(1) to spot 302(2). Continuing the example, at time t=2 the satellite 102 is now transmitting INE broadcast 178(2) to spot 302(6). In this illustration, the satellite 102 is transmitting a single INE broadcast 178 to a single spot 302 at a given time. In other implementations the satellite 102 may transmit a plurality of INE broadcasts 178 to a plurality of different spots 302. For example, the satellite 102 may include three downlink transmitters 278, each providing communication services to different pluralities of spots 302. Continuing the example, the three downlink transmitters 278 may be simultaneously transmitting respective INE broadcasts 178, each to a different spot 302.

By directing the INE broadcast 178 to a particular spot 302 at a particular time, overall efficiency and effectiveness of the system 100 is improved. Communication resources may be allocated for transmission of INE broadcasts 178 that service many spots 302, while still providing signal directionality that improves the communication link budget between the UT 108 and the satellite 102. For example, instead of a single broadcast signal spread across hundreds of spots 302 all the time, a spot 302 will receive an INE broadcast 178 with a greater received signal strength at the UT 108. This may be further improved as the UT 108 may also employ a directional receive pattern that is directed towards the expected location of the satellite 108, further improving received gain and improving the link budget.

As shown in this illustration, some spots 302 may include UTs 108 that have entered the network and are being provided communication service. For example, spot 302(2) includes UT 108(1), and spot 302(3) includes UT 108(2). Some spots 302 may be empty, having no UTs 108 present. In some situations, a UT 108 may be moved to a previously empty spot 302, or may be activated within a previously empty spot 302. As described below, the system 100 provides an INE process in this situation.

Figure 4:
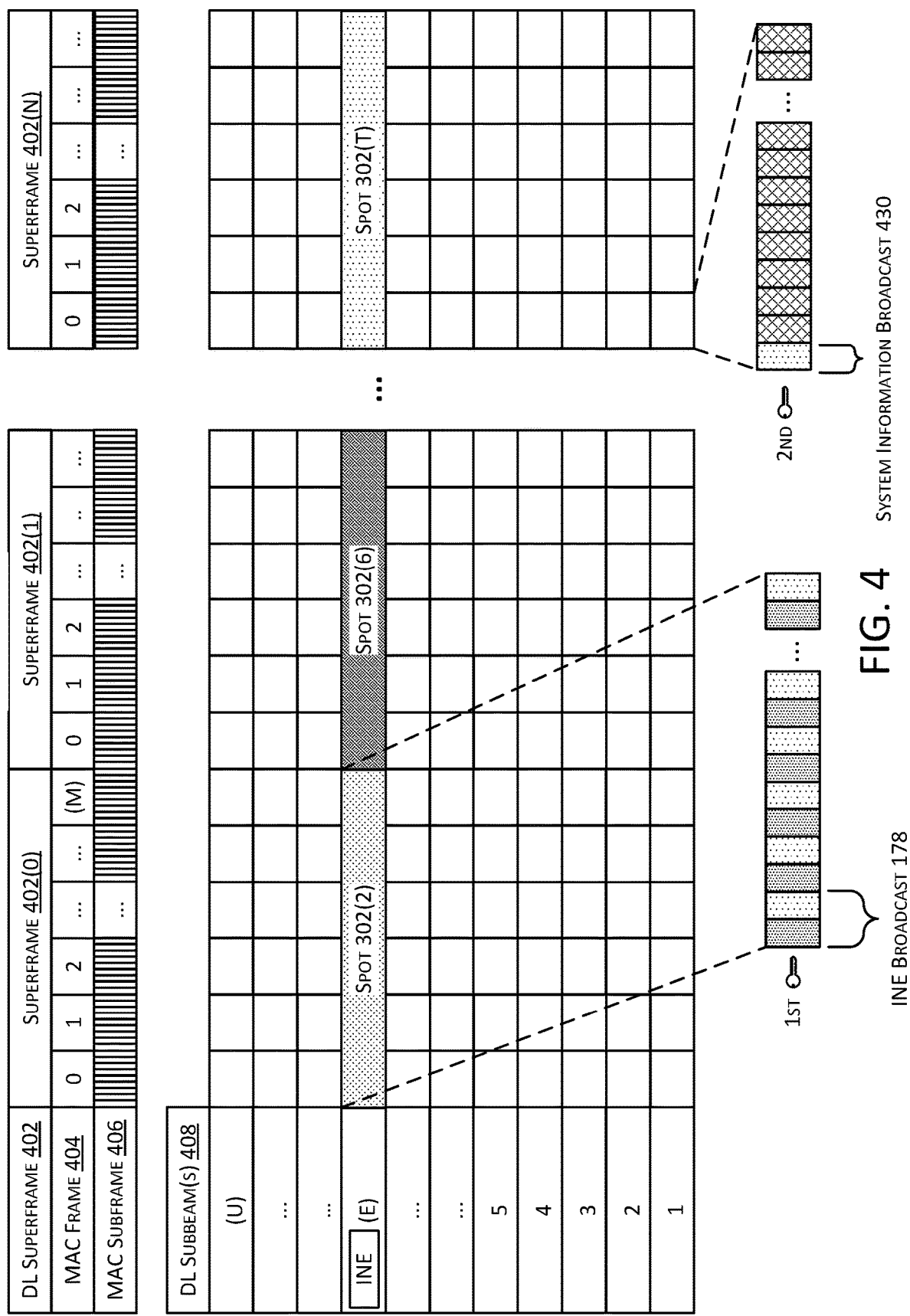
FIG. 4 is a diagram of superframes, INE broadcasts, and system information broadcasts, according to one implementation.

FIG. 4 is a diagram 400 of downlink (DL) superframes, INE broadcasts, and system information broadcasts, according to one implementation. With respect to the downlink from the satellite 102 to the UTs 108, the downlink resources may be described with respect to time and frequency. Time may be divided into superframes 402(0), 402(1), . . . , 402(N). Each superframe 402 may comprise a plurality of media access control (MAC) frames 404(0), 404(1), . . . , 404(M). Each MAC frame 404 may comprise a plurality of MAC subframes 406(1), 406(2), . . . , 406(P). In one implementation, a superframe 402 may have a first duration. Each superframe 402 may comprise a plurality of MAC frames 404, each having a second duration that is less than the first duration. Each MAC frame 404 may comprise a plurality of MAC subframes 406, each having a third duration that is less than the second duration.

The frequencies available for the downlink may be divided into DL subbeams 408. Each DL subbeam 408 corresponds to a particular frequency range, channel, and so forth. In this illustration, the downlink may be divided into DL subbeams 408(1), 408(2), . . . , 408(U).

One or more DL subbeams 408 may be allocated for use to transmit the INE broadcasts 178 to respective spots 302. In this illustration, DL subbeam 408(E) is allocated for INE use and is used to transmit the INE broadcast 178. For example, during the time associated with superframe 402(0), DL subbeam 408(E) is used to transmit the INE broadcast 178 to spot 302(2). Continuing the example, during the time associated with superframe 402(1), DL subbeam 408(E) is used to transmit the INE broadcast 178 to spot 302(6).

Figure 5:
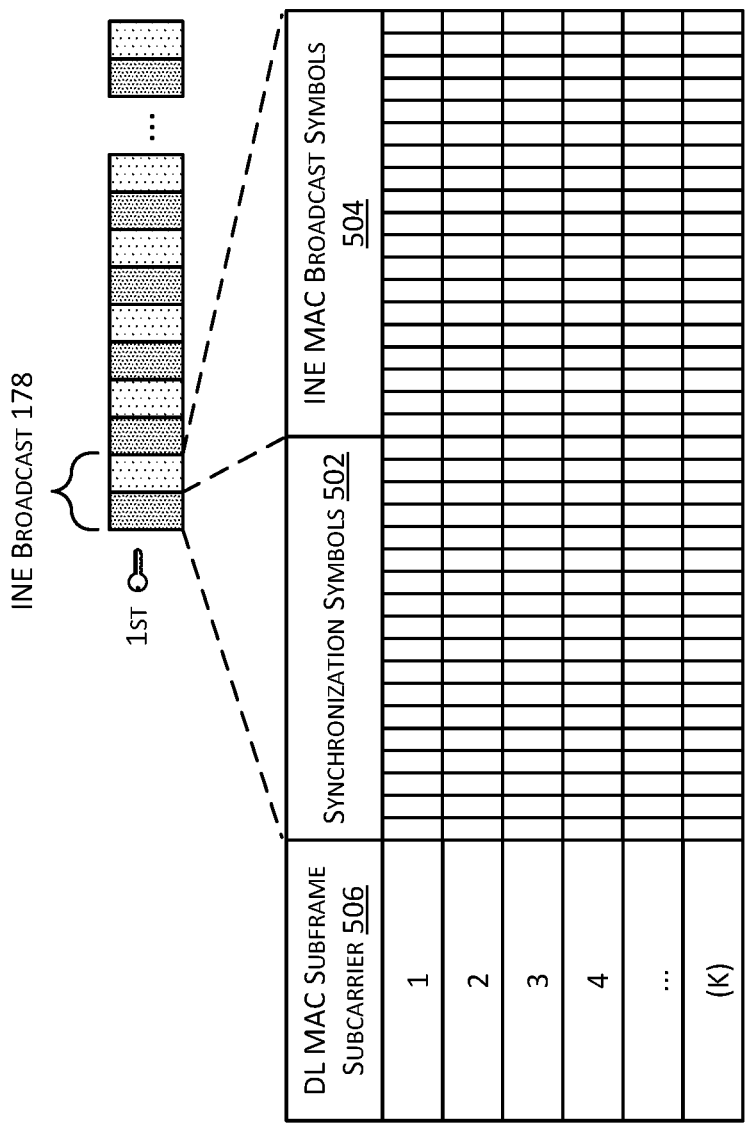
FIG. 5 is a diagram of INE broadcasts, according to one implementation.

The INE broadcast 178 is discussed in more detail with respect to FIG. 5. The INE broadcast 178 may be encrypted using a first key that is available to the satellite 102 and the UT 108.

Meanwhile, system information broadcasts (SIBS) 430 may be transmitted during the superframes 402 associated with other DL subbeams 408. The SIB 430 may comprise INE MAC broadcast symbols 504. In some implementations the SIB 430 may omit synchronization symbols 502. The SIB 430 may be encrypted using a second key that is associated with a particular spot 302.

FIG. 5 is a diagram 500 of INE broadcasts 178, according to one implementation. The INE broadcast 178 may be divided into two portions: synchronization symbols 502 and INE MAC broadcast symbols 504. In some implementations the INE broadcast 178 is encrypted. For example, the INE broadcast 178 may be encrypted using a first key.

The MAC subframes 406 may be associated with a plurality of DL MAC subframe subcarriers 506(1), 506(2), . . . , 506(K). In the implementation depicted in FIG. 5, each DL MAC subframe 404 uses subcarriers 506(1)-(K). In one implementation, the same synchronization symbols 502 and the same INE MAC broadcast symbols 504 may be transmitted on each of the MAC subframe subcarriers 502. In another implementation, the synchronization symbols 502 and the INE MAC broadcast symbols 504 may be transmitted using the plurality of DL MAC subframe subcarriers 506.

The synchronization symbols 502 may comprise a specified sequence of symbols that are used to provide synchronization information. For example, a first portion of the synchronization symbols 502 may have a first value while a second portion of the synchronization symbols 502 have a second value opposite the first. By detecting the specified sequence and the change from the first portion to the second portion, a timing reference may be determined. For example, the first portion of the synchronization symbols 502 may all represent "1" and the second portion may all represent "0". In other implementations, other techniques may be used. The quantity of possible individual symbol values may differ. For example, an individual symbol may utilize binary values representative of a "0" or "1".

The INE MAC broadcast symbols 504 may be used to convey information that may then be used by the UT INE system 188 to send an INE request. For example, the INE MAC broadcast symbols 504 may be used to indicate a spot 302 the broadcast is intended for, and an uplink (UL) frame number and subframe number that may be used by the UT 108 to send an INE request using RACH. The INE MAC broadcast symbols 504 may also include data such as a location of the satellite 102, velocity vector of the satellite 102, broadcast frame number, and so forth. The quantity of possible individual symbol values may differ. For example, an individual symbol may utilize binary values representative of a "0" or "1".

In some implementations, the INE MAC broadcast symbols 504 may omit frequency information. For example, based on receiving the INE broadcast 178 via a particular DL subbeam 408, a specified uplink frequency or UL subbeam may be retrieved. In another example, a specified UL frequency may be predetermined and subsequently used.

Figure 6:
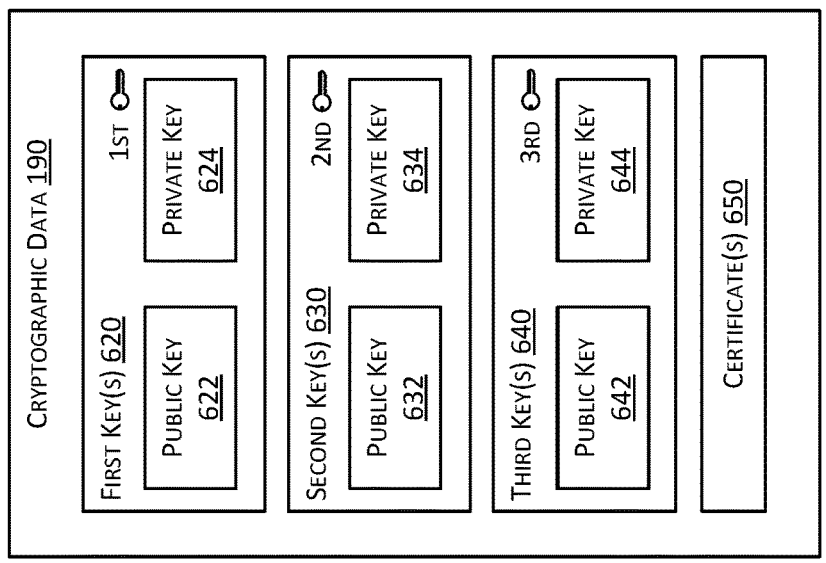
FIG. 6 depicts data used by the system during INE, according to some implementations.

FIG. 6 depicts at 600 data used by the system during INE, according to some implementations. The satellite 102 transmits INE broadcasts 178 to spots 302 as described herein.

The INE broadcast 178 or a portion thereof, such as the INE MAC broadcast symbols 504 may be used to send values 604 associated with one or more parameters 602. In one implementation, the INE broadcast 178 may send values 604 for one or more parameters 602 such as an intended spot 302, a UL RACH frame number, a UL RACH subframe number, start symbols, satellite data, broadcast frame number, and so forth. The value 604 of the intended spot 302 may indicate the spot 302 that the INE broadcast 178 is addressed to. The values 604 of the UL RACH frame number and the UL RACH subframe numbers may specify the particular uplink frame and subframe that are to be used for RACH transmission to the satellite 102. The value 604 of the start symbols may indicate start symbols that facilitate reception of the RACH transmission by the satellite 102. For example, the start symbols may comprise a predetermined sequence of symbols. The value 604 of the satellite data may be indicative of a position of the satellite 102, such as coordinates with respect to specified datum, a velocity vector of the satellite 102, and so forth. The value 604 of the broadcast frame number may be used to distinguish a particular INE broadcast 178 from another. For example, the broadcast frame number may be a sequentially issued number.

During operation, the UT 108 may utilize the ephemeris data 184. This may be previously stored or updated based on the satellite data received in the INE broadcast 178.

The RACH data 192 comprises values 608 associated with one or more parameters 606 associated with RACH operation to communicate with the satellite 102. The parameters 606 may comprise the UL RACH frame number, UL RACH subframe number, start symbols, and so forth. During operation, the UT INE system 188 may use the associated values 608 to send data to the satellite 102 using RACH.

The system 100 may utilize cryptographic data 190. The cryptographic data 190 may include one or more keys, certificates, digital signatures, and so forth. The cryptographic data 190 may be used to authenticate one or more devices, encrypt data, and so forth. The system 100 may use a public key infrastructure comprising public keys and private keys. The public key may be distributed and used to encrypt or digitally sign data, while the private key may be held secret and used to decrypt data or validate a digital signature. The system 100 may also use symmetric keys in some operations.

The cryptographic data 190 may include a first key 620 comprising a public key 622 and a private key 624. The first key 620 may be used by many devices, such as satellites 102, UTs 108, and so forth.

The cryptographic data 190 may include a second key 630 comprising a public key 632 and a private key 634. The second key 630 may be associated with operations involving a particular spot 302. For example, communications to and from UTs 108 located in spot 302(1) may be encrypted using second key 630(1), while communications to and from UTs 108 located in spot 302(2) are encrypted using second key 630(2).

The cryptographic data 190 may include a third key 640 comprising a public key 642 and a private key 644. The third key 640 may be associated with operations involving a particular communication session involving a particular UT 108. A communication session may comprise communication between a UT 108 and a particular satellite 102 or set of satellites 102. For example, communications to and from UT 108(1) and the satellite 102(1) may be encrypted using the third key 640.

The encryption used by the system 100 may be multilayered. For example, data from the UT 108 in the spot 302(2) may be encrypted first using the third key 640 associated with that particular session, with that encrypted data then encrypted using the second key 630(2) associated with the spot 302(2).

The cryptographic data 190 may also include one more digital certificates 650. These may be digitally signed by a device, such as using a private key.

The cryptographic data 190 may be used to facilitate authentication, mutual authentication, or other operations used to confirm that the devices participating in communication are authorized to communicate with one another.

Figure 7A:
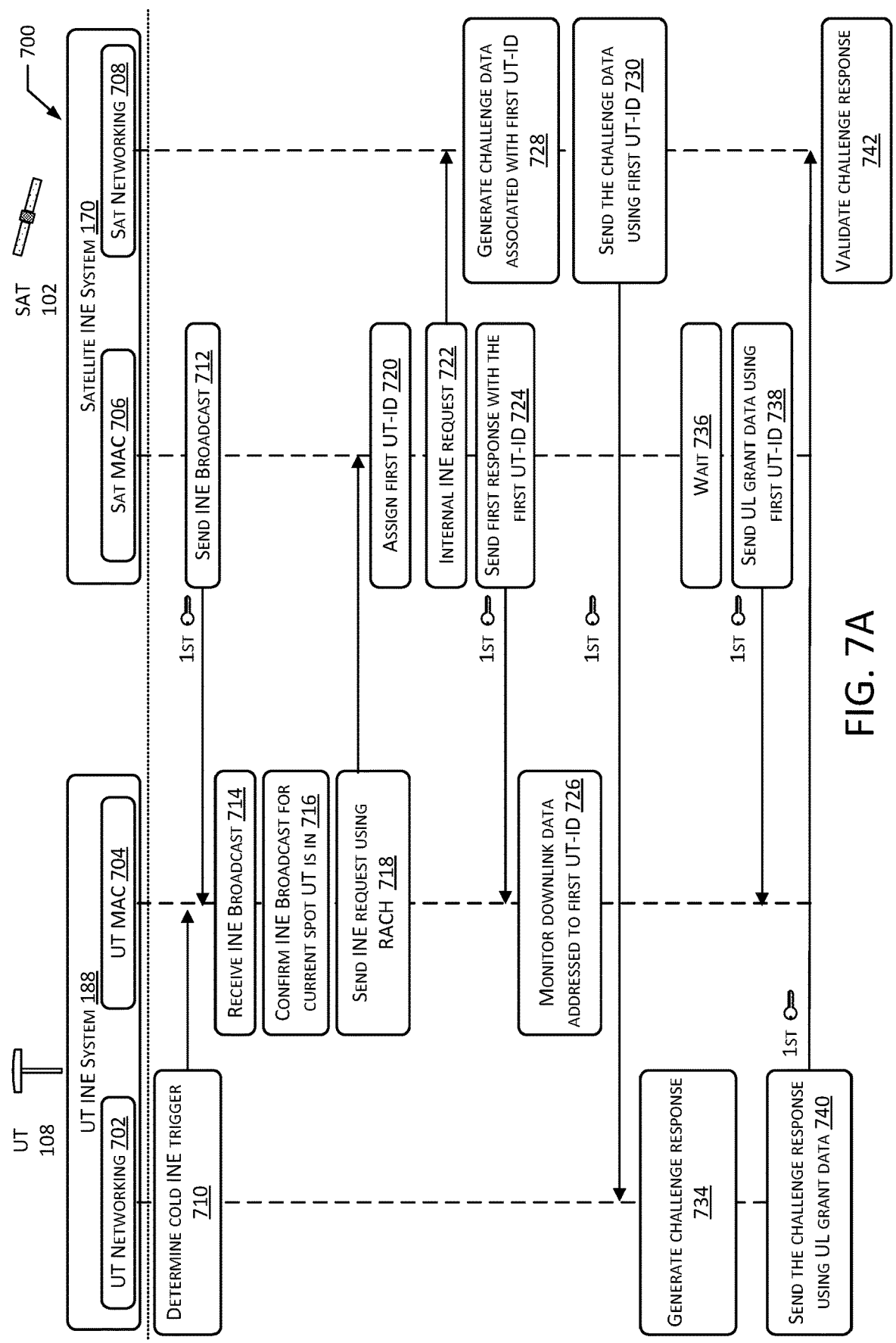
FIGS. 7A and 7B illustrate a process of performing a "cold" INE for a UT that is within a spot currently serviced by a subbeam, according to some implementations.
Figure 7B:
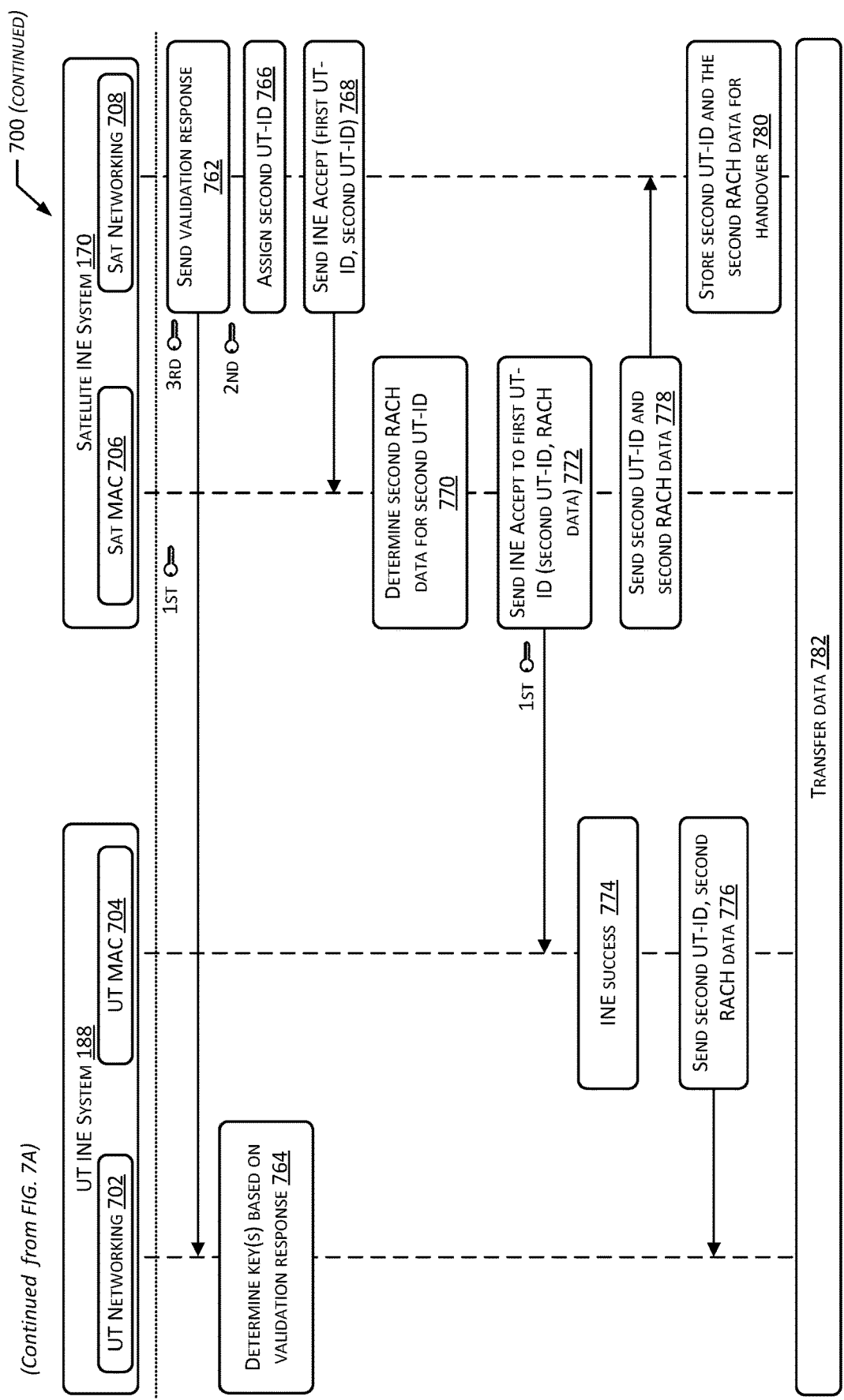

FIGS. 7A and 7B illustrate at 700 a process of performing a "cold" INE for a UT that is within a spot currently serviced by a subbeam, according to some implementations. The process may be implemented by one or more of the UT 108 or the satellite 102. In this illustration, time generally increases from top to bottom. For example, an operation depicted at the top of the page may occur before an operation depicted at the bottom of the page. Other elements of the system 100 are omitted from this illustration for clarity, and not as a limitation.

The UT INE system 188 may comprise one or more systems such as a UT networking 702 system, a UT media access control (MAC) 704 system, and so forth. For example, the UT networking 702 system may comprise hardware and software that implement network layer communication (layer 3 of the Open System Interconnect (OSI) model) while the UT MAC 704 system may comprise hardware and software that implement media layer communication (layer 2 of the OSI model). The satellite INE system 170 may comprise one or more systems such as a satellite MAC 706 system, a satellite networking 708 system, and so forth. For example, the satellite MAC 706 system may comprise hardware and software that implement media layer communication (layer 2 of the OSI model) while the satellite networking 708 system may comprise hardware and software that implement network layer communication (layer 3 of the OSI model).

At 710 a UT 108 determines a cold INE trigger has occurred, or that the UT 108 is in a cold INE state. In some implementations, this determination may be performed by the UT networking 702, or may be sent to the UT networking 702. The UT networking 702 may then send a message or signal to the UT MAC 704 indicative of the cold INE trigger.

The determination of the cold INE state may be based on one or more conditions. For example, the UT 108 may determine that a reset condition has occurred, and the UT 108 does not have an active session with a satellite 102. In another example, the UT 108 may determine that the UT 108 has never previously been in communication with a satellite 102 of the constellation. In yet another example, the UT 108 may determine that the previously stored data with respect to the constellation, such as the ephemeris data 184, handover data 164, cryptographic data 190, and so forth has expired.

The satellite 102, meanwhile, at 712 sends INE broadcast (s) 178 to the spot 302 that includes the UT 108. In some implementations, the satellite networking 708 may send an INE broadcast scanning command to the satellite MAC 706.

Responsive to the INE broadcast scanning command, the satellite MAC 706 may utilize the downlink transmitter 278 to transmit the INE broadcast 178 to the spot 302 during particular superframes 402.

In the implementation depicted in FIG. 7A, the satellite 102 has allocated a UL subbeam for use by other UTs 108 located within the spot 302 that the UT 108 requesting INE is also located within. The INE broadcast 178 associated with this spot 302 may include information indicative of the UL subbeam to be used to send data from UTs 108 located in that spot 302 to the satellite 102. For example, a UL subbeam may be allocated to a particular spot 302 to control contention on the RACH uplink. The INE broadcast 178 may also include information indicative of a DL subbeam to be used to send data from the satellite 102 to UTs 108 located in the spot 302.

During operation, the satellite 108 may use the uplink receiver(s) 280 to receive signals sent using the specified UL subbeam. As described above, the INE broadcast 178 may be encrypted using the first key 620.

At 714 the UT 108 receives the INE broadcast 178. For example, the UT MAC 704 may scan the sky in an attempt to receive the INE broadcast 178. During this scan, the UT MAC 704 receives the INE broadcast 178.

At 716 the UT 108 confirms that the INE broadcast 178 is associated with the current spot 302. For example, the UT MAC 704 may receive the INE broadcast 178. The INE broadcast 178 may be decrypted using the first key 620 previously stored at the UT 108.

Once decrypted, the INE MAC broadcast symbols 504 may be processed to determine information such as the intended spot 302, satellite data, RACH data 192, and so forth. The UT 108 may use an onboard GNSS receiver or manual entry to determine its geolocation, and the spot 302 that is it located within. If the INE broadcast 178 is addressed to the spot 302 that the UT 108 is located within, the process may continue. If not, the process may return to 714 and attempt to receive an INE broadcast 714 that is addressed to the spot 302 that the UT 108 is located within.

At 718 the UT 108 sends an INE request to the satellite 102 using the RACH data 192 provided in the INE broadcast 178. For example, based on the information included in the INE broadcast 178, the UT MAC 704 waits until the time associated with the designated UL RACH frame number and UL RACH subframe number and transmits an INE request that includes the start symbols. In some implementations, the RACH data 192 may include a UL subbeam that indicates one or more of a channel, frequency, modulation, and so forth to be used for transmission of the INE request. The INE request may be unencrypted.

At 720 the satellite 102 receives the INE request and assigns a first UT identifier (UT-ID). In one implementation, the first UT-ID may be "temporary" and may be replaced with a second UT-ID as described below. In another implementation, the first UT-ID may be used throughout the process, and the replacement with the second UT-ID may be omitted. The UT-ID may be used to distinguish UTs 108 serviced by the satellite 102, within a particular spot 302, and so forth. In some implementations the first UT-ID may be assigned by the management system 150.

In some implementations, the satellite 102 may determine, before proceeding to 722, that the INE request is properly received from a spot 302 that the satellite 102 is currently receiving data from. For example, if the satellite 102 receives an INE request from a UT 108(47) that asserts it is within spot 302(5) but this is received using a receive subbeam that is directed at spot 302(1), an error may be returned and the process may stop. In another example, if the satellite 102 receives an INE request from the UT 108(1) that reports (or was previously registered as located within) spot 302(2) via the receive subbeam that is directed at spot 302(2), the process may proceed.

The INE request may include other information that is indicative of the individual UT 108. For example, the UT 108 may determine a distinguishing value that is included in transmissions to indicate the source of the transmission. In some implementations, the distinguishing value may comprise a MAC address. In other implementations, the distinguishing value may comprise a random number determined by the UT 108. This random number may be formatted to have a shorter bit length than the MAC address, to reduce transmission time on the RACH uplink. In the event two or more UTs 108 select an identical random number as their distinguishing value within a given window of time, the satellite 102 may reject successive transmissions with the same distinguishing value. In this example, the UTs 108 may then generate a new distinguishing value and transmit another INE request in an attempt to deconflict.

In some implementations, the satellite 102 may transmit a "back off" message that results in UTs 108 delaying their network entry attempts. The back off message may indicate a minimum time to delay INE. Responsive to the back off message, the UTs 108 may wait before proceeding with the INE process. For example, if a count of INE requests exceeds a threshold value, the satellite 102 may transmit the back off message.

At 722 the satellite MAC 706 sends an internal INE request or data based on the INE request from the UT 108 to the satellite networking 708. Responsive to the internal INE request, at 728 the satellite networking 708 may generate challenge data that is associated with the first UT-ID. The challenge data may be used to authenticate one or more of the UT 108 or the satellite 102. For example, the challenge data may use the cryptographic data 190.

At 724 the satellite 102 sends a first response with the first UT-ID to the UT 108. For example, the satellite MAC 706 may use the downlink transmitter 278 to send the first response. The first response may be encrypted. For example, the first key 620 may be used to encrypt the first response.

At 726 the UT 108 has received the first response and proceeds to monitor the downlink data for data addressed to the first UT-ID. For example, based on the first response, the UT MAC 704 may monitor the DL subbeam and process data addressed to the first UT-ID. In implementations where the first response is encrypted using the first key 620, the UT 108 may decrypt the data using the previously stored first key 620 data.

At 730 the satellite networking 708 sends the challenge data addressed to the first UT-ID. For example, the satellite networking 708 may send the challenge data to the satellite MAC 706. Continuing the example, the satellite MAC 706 may receive challenge data from the satellite networking 708 and transmit using the downlink transmitter 278. The challenge data may be encrypted. For example, the first key 620 may be used to encrypt the challenge data.

At 734 the UT 108 receives the challenge data and generates a challenge response responsive to the challenge data. For example, the UT networking 702 may accept the challenge data as input and generate one or more signed digital certificates 650 in response, based at least in part on cryptographic data 190 stored at the UT 108. In implementations where the challenge response is encrypted using the first key 620, the UT 108 may decrypt the data using the previously stored first key 620 data.

In some implementations, to allow the UT 108 time to respond to the challenge data, at 736 the satellite 102 may wait for a specified time.

At 738 the satellite 102 allocates and sends UL grant data 168 to the first UT-ID. For example, responsive to the internal INE request 722 and sending of the challenge data, the satellite 102 may determine UL grant data 168 that allocates communication resources on the uplink to the satellite 102. The UL grant data 168 may be encrypted. For example, the first key 620 may be used to encrypt the UL grant data 168. Upon receipt, the UT 108 may decrypt the encrypted UL grant data 168.

At 740 the UT 108 sends the challenge response to the satellite 102 using the UL grant data 168. For example, the UT networking 702 may send the challenge response to the UT MAC 704. The UT MAC 704 may then use the previously received UL grant data 168 to operate an uplink transmitter at the UT 108 to send the challenge response to the satellite 102.

At 742 the satellite 102 has received the challenge response and attempts to validate the challenge response. If the validation is successful, the process may determine a validation response and proceed to 762. If the validation is unsuccessful, a failure message may be sent to the UT 108, further communication with the UT 108 may be discontinued, or other actions may be taken.

At 762 the validation response is sent to the UT 108. In some implementations, the validation response may comprise a second key 630. In some implementations, the validation response may also comprise second certificate(s) 650 determined during the validation at 742.

The satellite 102 may also derive a third key 640 for use with the UT 108. For example, the satellite 102 may use an Elliptic-Curve Diffie-Hellman (ECDH) algorithm with inputs being a temporary UT public key received from the UT 108 at 740, and a temporary satellite private key stored by the satellite 102 and sent at 730 as the challenge data. The data including the second certificate(s) 650(2) and the second key 630 may be encrypted using the derived third key 640. This data may be further encrypted using the first key 620. The temporary UT public key is associated with a temporary UT private key. The temporary satellite public key is associated with a temporary satellite private key.

At 764 the UT 108 receives the validation response. The UT 108 decrypts the data and determines the third key 640 and the second key 630. For example, the third key 640 may be derived using the ECDH algorithm, a temporary UT private key, and the temporary satellite public key. In other implementations, other techniques may be used to determine the third key 640.

At this time, the UT 108 has the previously stored first key 620, the second key 630, and the third key 640. In other implementations some keys may be omitted or additional keys may be added.

At 766 a second UT-ID is associated to the UT 108. In some implementations this step may be omitted and the following operations may instead continue to use the first UT-ID.

At 768 a first INE acceptance message is sent from the satellite networking 708 to the satellite MAC 706. The INE acceptance message may comprise the first UT-ID and the second UT-ID.

At 770 the satellite MAC 706 determines second RACH data 192(2) for the second UT-ID. This may be responsive to the first INE acceptance message.

At 772 a second INE acceptance message is transmitted from the satellite 102 to the UT 108. The second INE acceptance message may be addressed to the first UT-ID. The second INE acceptance message may comprise the second UT-ID and second RACH data 192(2). The second INE acceptance message may be encrypted. For example, the first key 620 may be used to encrypt the second INE acceptance message.

At 774 the UT 108 receives the second INE acceptance message and determines INE success. For example, the UT MAC 704 may receive the second INE acceptance message. Upon receipt, the UT 108 may decrypt the encrypted second INE acceptance message.

At 776 the UT MAC 704 sends the second UT-ID to the UT networking 702. The UT 108 may then use the second UT-ID and the second RACH data 192(2) for subsequent communication.

At a later time, the UT 108 may use the second RACH data 192(2) to request communication resources on the uplink. For example, the UT 108 may use the second RACH data 192(2) to send buffer data status (BDS) indicative of upstream data 112 queued for transmission by the UT 108. Responsive to the BDS, the satellite 102 may determine and send grant data 168 that allocates communication resources on the uplink.

At 778 the satellite MAC 706 sends the second UT-ID and second RACH data 192(2) to the satellite networking 708. At 780 the satellite networking 708 may store the second UT-ID and the second RACH data 192(2) for later use. For example, this information may be used during a subsequent handover of communication service provided to the UT 108 from the satellite 102 to another satellite 102.

At 782 data may be transferred between the UT 108 and the satellite 102. This data may be encrypted using the cryptographic data 190. For example, data may be encrypted using the third keys 640 and second keys 630. In some implementations, additional operations may be performed before transfer of upstream data 112 or downstream data 142 is permitted.

Figure 8:
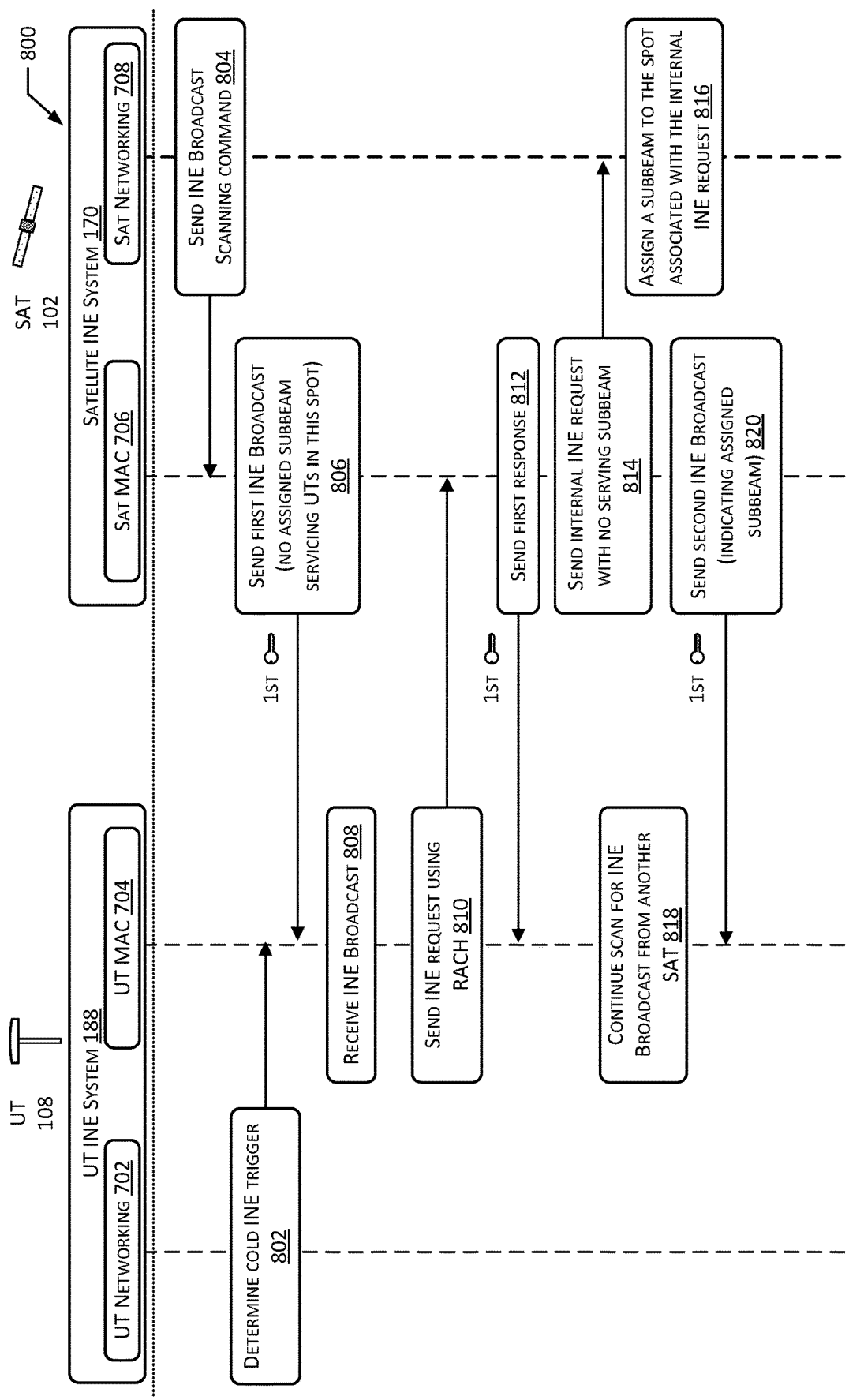
FIG. 8 illustrates a process of performing a "cold" INE for a UT that is within a spot not currently serviced by a subbeam, according to some implementations.

FIG. 8 illustrates at 800 a process of performing a "cold" INE for a UT 108 that is within a spot 302 not currently serviced by a UL subbeam, according to some implementations. For example, a UT 108 that has been moved to a spot 302 that has no active UTs 108, and is attempting INE. The process may be implemented by one or more of the UT 108 or the satellite 102. In this illustration, time generally increases from top to bottom. For example, an operation depicted at the top of the page may occur before an operation depicted at the bottom of the page. Other elements of the system 100 are omitted from this illustration for clarity, and not as a limitation.

As described above, the UT INE system 188 may comprise one or more systems such as the UT networking 702, the UT MAC 704, and so forth. The satellite INE system 170 may comprise one or more systems such as the satellite MAC 706, the satellite networking 708, and so forth.

At 802 a UT 108 determines a cold INE trigger has occurred, or that the UT 108 is in a cold INE state. In some implementations, this determination may be performed by the UT networking 702, or may be sent to the UT networking 702. The UT networking 702 may then send a message or signal to the UT MAC 704 indicative of the cold INE trigger.

At 804 the satellite networking 708 may send an INE broadcast scanning command to the satellite MAC 706. The INE broadcast scanning command may specify one or more spots 302 that are to receive INE broadcasts 178. At this point, the satellite networking 708 may be unaware of the presence of the UT 108 in the particular spot 302. The satellite networking 708 may operate to provide INE broadcast scanning commands that result in INE broadcasts 178 being transmitted to spots 302 that have no known UTs 108 present therein.

In some implementations, the INE broadcast scanning command may be informed by other data. For example, physical shipment information indicating a shipping address within a particular spot 302 may be used to add the particular spot 302 to a set of spots 302 to be sent INE broadcasts 178. In another implementation, the INE broadcast scanning command may be determined such that all spots 302 within range of the satellite 102 are sent the INE broadcasts 178.

At 806 the satellite 102 sends a first INE broadcast 178(1) to the spot 302 that happens to include the UT 108. Responsive to the INE broadcast scanning command, the satellite MAC 706 may utilize the downlink transmitter 278 to transmit the first INE broadcast 178(1) to the spot 302 during particular superframes 402.

In the implementation depicted in FIG. 8, the satellite 102 has not previously allocated an uplink subbeam to the spot 302 that the UT 108 is also located within. The INE broadcast 178 associated with this spot 302 may include information indicative of a general UL subbeam that may be used to send data from UTs 108 located in that spot 302 to the satellite 102. This general UL subbeam may not be associated with a specific spot 302. During operation, the satellite 108 may use the uplink receiver(s) 280 to receive signals sent using the general UL subbeam. As described above, the INE broadcast 178 may be encrypted using the first key 620.

At 808 the UT 108 receives the INE broadcast 178. For example, the UT MAC 704 may scan the sky in an attempt to receive the first INE broadcast 178(1). During this scan, the UT MAC 704 receives the first INE broadcast 178(1). The first INE broadcast 178(1) may be decrypted using the first key 620 previously stored at the UT 108.

Once decrypted, the first INE MAC broadcast symbols 504(1) may be processed to determine information such as the intended spot 302, satellite data, first RACH data 192(1), and so forth.

At 810 the UT 108 sends an INE request to the satellite 102 using the first RACH data 192(1) provided in the first INE broadcast 178(1). For example, based on the information included in the INE broadcast 178, the UT MAC 704 waits until the time associated with the designated general UL RACH frame number and general UL RACH subframe number and transmits an INE request that includes the start symbols. In some implementations, the first RACH data 192(1) may include a UL subbeam that indicates one or more of a channel, frequency, modulation, and so forth to be used for transmission of the INE request. The INE request may be unencrypted.

The satellite 102 receives the INE request and assigns a first UT-ID. This first UT-ID may be "temporary" and may be replaced with a second UT-ID as described below. The first UT-ID may be used to distinguish UTs 108 serviced by the satellite 102, within a particular spot 302, and so forth.

The INE request may include other information that is indicative of the individual UT 108. For example, the UT 108 may determine a distinguishing value that is included in transmissions to indicate the source of the transmission. In some implementations, the distinguishing value may comprise a MAC address. In other implementations, the distinguishing value may comprise a random number determined by the UT 108. This random number may be formatted to have a shorter bit length than the MAC address, to reduce transmission time on the RACH uplink. In the event two or more UTs 108 select an identical random number as their distinguishing value within a given window of time, the satellite 102 may reject successive transmissions with the same distinguishing value. In this example, the UTs 108 may then generate a new distinguishing value and transmit another INE request in an attempt to deconflict.

At 812 the satellite 102 sends a first response with the first UT-ID to the UT 108. For example, the satellite MAC 706 may use the downlink transmitter 278 to send the first response. The first response may be encrypted. For example, the first key 620 may be used to encrypt the first response.

In some implementations, the satellite 102 may transmit a "back off" message that results in UTs 108 delaying their network entry attempts. The back off message may indicate a minimum time to delay INE. Responsive to the back off message, the UTs 108 may wait before proceeding with the INE process.

At 814 the satellite MAC 706 sends an internal INE request or data based on the INE request from the UT 108 to the satellite networking 708.

Responsive to the internal INE request, at 816 the satellite networking 708 assigns a UL subbeam to the spot 302 associated with the internal INE request. A DL subbeam may also be allocated to the spot 302.

At 818 the UT 108 continues to scan for INE broadcasts 178. These may include INE broadcasts 178 from the satellite 102 that transmitted the first INE broadcast 178(1), or another satellite 102 in the constellation.

At 820 the satellite 102 sends a second INE broadcast 178(2) to the spot 302 that includes the UT 108. For example, responsive to 816, the satellite networking 708 may send an INE broadcast scanning command. Responsive to the INE broadcast scanning command, the satellite MAC 706 may utilize the downlink transmitter 278 to transmit the second INE broadcast 178(2) to the spot 302 during particular superframes 402. The second INE broadcast 178(2) includes information indicative of the assigned UL subbeam, and may also include information indicative of the assigned DL subbeam.

The process may then proceed to operation 716 as discussed with regard to FIG. 7A.

Figure 9:
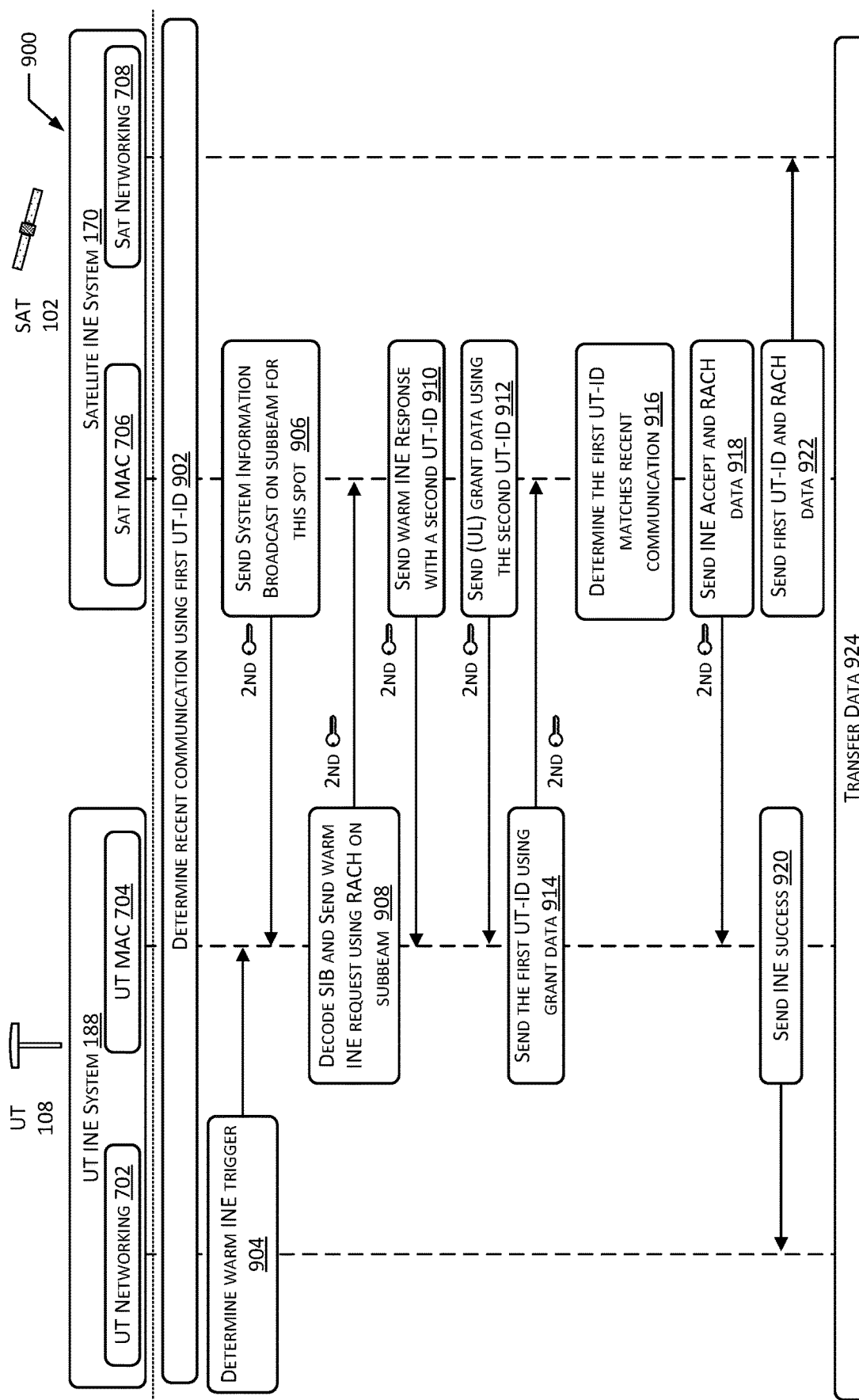
FIG. 9 illustrates a process of performing a "warm" INE for a UT that was recently in communication with a satellite, according to some implementations.

FIG. 9 illustrates at 900 a process of performing a "warm" INE for a UT 108 that was recently in communication with a satellite 102, according to some implementations. The process may be implemented by one or more of the UT 108 or the satellite 102. In this illustration, time generally increases from top to bottom. For example, an operation depicted at the top of the page may occur before an operation depicted at the bottom of the page. Other elements of the system 100 are omitted from this illustration for clarity, and not as a limitation.

As described above, the UT INE system 188 may comprise one or more systems such as the UT networking 702, the UT MAC 704, and so forth. The satellite INE system 170 may comprise one or more systems such as the satellite MAC 706, the satellite networking 708, and so forth.

In some situations, communication between a UT 108 and a satellite 102 may be interrupted. For example, meteorological conditions such as heavy rain, lightening, and so forth may interrupt communication. In another example, loss of electrical power or a reset at one or more of the UT 108 or satellite 102 may result in an interruption of communication. Such interruptions may affect many UTs 108. For example, a power outage that affects UTs 108 located within a spot 302 may result in thousands of UTs 108 attempting to re-join the network after electrical power is restored. The "warm" INE process allows for rapid and efficient rejoinder of UTs 108 to the network.

At 902 a determination is made that there has been recent communication using a first UT-ID that is associated with a UT 108. Data associated with operation of the system 100, such as ephemeris data 184, handover data 164, cryptographic data 190, and so forth may be sent to the UT 108 after network entry.

In one implementation, recent communication may be deemed to have occurred if the UT INE system 188 determines that ephemeris data 184, first RACH data 192(1), handover data 164, and cryptographic data 190 have not expired. Different expiration limits may be specified for different data. For example, ephemeris data 184 may expire in 22 hours, handover data 164 may expire within 20 minutes, and cryptographic data 190 such as a third key 640 may expire within 10 minutes.

In one implementation, recent communication may be deemed to have occurred if the satellite INE system 170 determines that cryptographic data 190 associated with the first UT-ID has not expired, that a transmission has been received from the first UT-ID within a threshold time, and so forth. Different expiration limits may be specified for different data.

At 904 a UT 108 determines a warm INE trigger has occurred, or that the UT 108 is in a warm INE state. In some implementations, this determination may be performed by the UT networking 702, or may be sent to the UT networking 702. The UT networking 702 may then send a message or signal to the UT MAC 704 indicative of the warm INE trigger.

The determination of the warm INE state may be based on one or more conditions. For example, the UT 108 may determine recent communication with the satellite 102 has occurred within a threshold interval of time. In yet another example, the UT 108 may determine that the previously stored data with respect to the constellation, such as the ephemeris data 184, handover data 164, cryptographic data 190, and so forth has not expired.

At 906 the satellite 102 sends a system information broadcast (SIB) 430 on a DL subbeam that is allocated to this spot 302. This operation may occur in addition to transmission of a separate INE broadcast 178 to the spot 302 which may occur at the same time or at a different time. The SIB 430 may be encrypted. For example, the SIB 430 may be encrypted using the second key 630.

At 908 the UT 108 receives and decodes the SIB 430. Once decrypted, the data included in the SIB 430 may be processed to determine information such as the satellite data, second RACH data 192(2), and so forth. Based on this information, at 908 a warm INE request is sent to the satellite 102. The warm INE request may be encrypted. For example, the warm INE request may be encrypted using the second key 630.

In the event the SIB 430 is unable to be decoded, the process may proceed to the cold INE process, such as described with respect to FIGS. 7A and 7B.

At 910 the satellite 102 sends a warm INE response with a second UT-ID to the UT 108. For example, the satellite MAC 706 may use the downlink transmitter 278 to send the warm INE response. The warm INE response may be encrypted. For example, the second key 630 may be used to encrypt the warm INE response.

In some implementations, the satellite 102 may transmit a "back off" message that results in UTs 108 delaying their network entry attempts. The back off message may indicate a minimum time to delay INE. Responsive to the back off message, the UTs 108 may wait before proceeding with the INE process.

At 912 the satellite 102 allocates communication resources and sends UL grant data 168 to the second UT-ID. For example, responsive to the warm INE request, the satellite 102 may determine UL grant data 168 that allocates communication resources on the uplink to the satellite 102. The UL grant data 168 may be encrypted. For example, the second key 630 may be used to encrypt the UL grant data 168. Upon receipt, the UT 108 may decrypt the encrypted UL grant data 168.

At 914 the UT 108 uses the UL grant data 168 to send the first UT-ID to the satellite 102. The first UT-ID may be encrypted. For example, the first UT-ID may be encrypted using the second key 630.

At 916 the satellite 102 receives the first UT-ID from the UT 108 and determines that the first UT-ID matches data previously stored during recent communication with the satellite 108.

At 918 an INE acceptance message is transmitted from the satellite 102 to the UT 108. The INE acceptance message may be addressed to the first UT-ID. The INE acceptance message may comprise the first UT-ID and third RACH data 192(3). The second INE acceptance message may be encrypted. For example, the second key 630 may be used to encrypt the second INE acceptance message.

At 920 the UT MAC 704 sends an INE success message to the UT networking 702. The UT 108 may then use the first UT-ID and the third RACH data 192(3) for subsequent communication.

At a later time, the UT 108 may use the third RACH data 192(3) to request communication resources on the uplink. For example, the UT 108 may use the third RACH data 192(3) to a send buffer data status (BDS) indicative of upstream data 112 queued for transmission by the UT 108. Responsive to the BDS, the satellite 102 may determine and send grant data 168 that allocates communication resources on the uplink.

At 922 the satellite MAC 706 sends the first UT-ID and third RACH data 192(3) to the satellite networking 708. The satellite networking 708 may store the first UT-ID and the third RACH data 192(3) for later use. For example, this information may be used during a subsequent handover of communication service provided to the UT 108 from the satellite 102 to another satellite 102.

At 924 data transfer or other operations may be performed. In one example, an authentication process may be performed. In another example, third keys 640 may be determined and associated with the UT 108. In some implementations, a cold INE request or a warm INE request may result in immediate deprecation of previously assigned keys or other cryptographic data 190.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first satellite comprising:
a first network interface; and
a first set of one or more processors executing instructions to:
transmit a first initial network entry (INE) broadcast using the first network interface, wherein the first INE broadcast comprises:
a first portion comprising a first plurality of synchronization symbols, and
a second portion comprising first data indicative of a first subbeam identifier and a first set of symbols associated with random access channel (RACH) operation;
receive a first request from a first user terminal (UT);
assign a first UT identifier (UT-ID) to the first UT;
transmit a first response comprising the first UT-ID; and
transmit second data addressed to the first UT-ID, wherein the second data comprises a second subbeam identifier, and a second set of symbols associated with RACH operation.

2. The system of claim 1, the first set of one or more processors further executing instructions to:
communicate with one or more UTs using a first subbeam at a first time, wherein the one or more UTs are located within a first geographic area; and
transmit, at a second time after the first time, the first INE broadcast to the first geographic area using a second subbeam;
wherein the first UT is located within the first geographic area.

3. The system of claim 1, the first set of one or more processors further executing instructions to:
determine at a first time that no UTs in communication with the first satellite are located within a first geographic area; and
transmit, at a second time after the first time, the first INE broadcast to the first geographic area using a first subbeam;
wherein the first UT is located within the first geographic area.

4. The system of claim 1, the first set of one or more processors further executing instructions to:
transmit, at a first time, the first INE broadcast to a first geographic area; and
transmit, at a second time, a second INE broadcast to a second geographic area, wherein the second INE broadcast comprises third data indicative of a third subbeam identifier and a third set of symbols associated with RACH operation.

5. The system of claim 1, the first set of one or more processors further executing instructions to:
encrypt, before transmission, the first INE broadcast using a first key.

6. The system of claim 1, the first set of one or more processors further executing instructions to:
generate challenge data associated with the first UT;
transmit the challenge data to the first UT;
transmit uplink grant data to the first UT, wherein the uplink grant data specifies communication resources that are allocated to the first UT; and
receive a challenge response from the first UT using the communication resources specified by the uplink grant data.

7. The system of claim 6, the first set of one or more processors further executing instructions to:
encrypt, before transmission, the first INE broadcast using a first key;
encrypt, before transmission, the first response, the challenge data, and the uplink grant data using the first key;
decrypt the challenge response using the first key;
determine the challenge response is valid;
determine a geographic area that the first UT is located within;
determine a second key associated with the geographic area;
encrypt the second key to generate an encrypted second key;
transmit the encrypted second key to the first UT; and
encrypt, before transmission, the second data using the first key.

8. The system of claim 1, the first UT comprising:
a global navigation satellite system (GNSS) receiver;
a second network interface; and
a second set of one or more processors executing instructions to:
determine a location of the first UT;
determine, based on the location of the first UT, a geographic area that is associated with communication service by a satellite constellation comprising the first satellite, wherein the first UT is within the geographic area;
receive the first INE broadcast;
determine the first INE broadcast is associated with the geographic area; and
transmit the first request using the second network interface.

9. The system of claim 1, the first UT comprising:
a second network interface; and
a second set of one or more processors executing instructions to:
receive the second data;
determine third data indicative of data queued for transmission by the first UT;
operate the second network interface based on the second data to transmit the third data;
receive, using the second network interface, fourth data indicative of communication resources associated with an uplink to the first satellite, wherein the fourth data is responsive to the third data; and operate the second network interface based on the fourth data to transmit the data queued for transmission.

10. A method comprising:
determining, by a first satellite, a first initial network entry (INE) broadcast, wherein the first INE broadcast comprises first data indicative of a first subbeam identifier and a first set of symbols associated with random access channel (RACH) operation;
encrypting, by the first satellite, the first INE broadcast using a first key;
transmitting, by the first satellite, the first INE broadcast;
receiving, by the first satellite, a first request from a first user terminal (UT);
determining a first UT identifier (UT-ID) that is associated with the first UT;
transmitting, by the first satellite, a first response comprising the first UT-ID; and
transmitting, by the first satellite using the first UT-ID, second data to the first UT-ID, wherein the second data comprises a second subbeam identifier, a second set of symbols associated with RACH operation, and the first UT-ID.

11. The method of claim 10, further comprising:
communicating, by the first satellite, with one or more UTs using a first subbeam at a first time, wherein the one or more UTs are located within a first geographic area; and
transmitting, by the first satellite at a second time after the first time, the first INE broadcast to the first geographic area using a second subbeam;
wherein the first UT is located within the first geographic area.

12. The method of claim 10, further comprising:
determining, by the first satellite, at a first time that no UTs in communication with the first satellite are located within a first geographic area; and
transmitting, by the first satellite, at a second time after the first time, the first INE broadcast to the first geographic area using a first subbeam;
wherein the first UT is located within the first geographic area.

13. The method of claim 10, further comprising:
transmitting, by the first satellite at a first time, the first INE broadcast to a first geographic area; and
transmitting, by the first satellite at a second time, a second INE broadcast to a second geographic area, wherein the second INE broadcast comprises third data indicative of a third subbeam identifier and a third set of symbols associated with RACH operation.

14. The method of claim 10, wherein the first INE broadcast comprises:
a first portion comprising a first plurality of synchronization symbols; and
a second portion comprising the first subbeam identifier and the first set of symbols.

15. The method of claim 10, further comprising:
generating, by the first satellite, challenge data associated with the first UT;
transmitting, by the first satellite, the challenge data to the first UT;
transmitting, by the first satellite, uplink grant data, wherein the uplink grant data specifies communication resources on an uplink to the first satellite that are allocated to the first UT; and
receiving, by the first satellite from the first UT using the communication resources specified by the uplink grant data, a challenge response.

16. The method of claim 15, further comprising:
encrypting, by the first satellite before transmission, the first response, the challenge data, and the uplink grant data using the first key;
decrypting, by the first satellite, the challenge response using the first key;
determining, by the first satellite, the challenge response is valid;
determining, by the first satellite, a geographic area that the first UT is located within;
determining, by the first satellite, a second key associated with the geographic area;
encrypting, by the first satellite, the second key to determine an encrypted second key;
transmitting, by the first satellite, the encrypted second key to the first UT; and
encrypting, by the first satellite before transmission, the second data using the first key.

17. The method of claim 10, further comprising:
receiving, by the first UT, the second data;
determining, by the first UT, third data indicative of data queued for transmission by the first UT;
operating a first network interface of the first UT, based on the second data, to transmit the third data;
receiving, using the first network interface of the first UT, fourth data indicative of communication resources associated with an uplink to the first satellite, wherein the fourth data is responsive to the third data; and
operating the first network interface of the first UT based on the fourth data to transmit the data queued for transmission.

18. A first satellite comprising:
a first network interface; and
a first set of one or more processors executing instructions to:
communicate at a first time, using the first network interface, with a first user terminal (UT) using a first subbeam, wherein the first UT is associated with a first UT identifier (UT-ID);
transmit, to the first UT, first data indicative of a transfer of communication service at a later time of the first UT from the first satellite to a second satellite;
transmit first system information using the first network interface, wherein the first system information comprises second data indicative of a first set of symbols associated with random access channel (RACH) operation;
receive a first request from the first UT using the first subbeam;
assign a second UT-ID to the first UT;
transmit a first response comprising the second UT-ID;
transmit third data, wherein the third data specifies communication resources on an uplink to the first satellite that are allocated to the second UT-ID;
receive fourth data comprising the first UT-ID, wherein the fourth data is received via the communication resources specified by the third data;
determine the first UT-ID received in the fourth data corresponds to the first UT associated with the first time; and
transmit fifth data that is addressed to the first UT-ID, wherein the fifth data comprises a second set of symbols associated with RACH operation.

19. The first satellite of claim 18, the first set of one or more processors further executing the instructions to:
  encrypt, before transmission, the first system information, the first response, the third data, and the fifth data using a first key, wherein the first key is associated with a first geographic area; and
  decrypt the first request and the fourth data using the first key.

20. The first satellite of claim 18, the first set of one or more processors further executing the instructions to:
  determine, within a first time interval, a plurality of requests from UTs for network entry, wherein the plurality of requests exceeds a threshold value;
  wherein the first system information comprises data to direct one or more UTs of the plurality of UTs, to delay network entry attempts.

* * * * *